(12) United States Patent
Kadel et al.

(10) Patent No.: US 7,964,161 B2
(45) Date of Patent: Jun. 21, 2011

(54) MICROSTRUCTURED DEVICE FOR REMOVABLE STORAGE OF SMALL AMOUNTS OF LIQUID AND A PROCESS FOR REMOVAL OF LIQUID STORED IN THIS DEVICE

(76) Inventors: Klaus Kadel, Witten (DE); Gert Blankenstein, Dortmund (DE)

( * ) Notice: Subject to any disclaimer, the term of this patent is extended or adjusted under 35 U.S.C. 154(b) by 0 days.

(21) Appl. No.: 12/292,029

(22) Filed: Nov. 10, 2008

(65) Prior Publication Data

US 2009/0074626 A1    Mar. 19, 2009

Related U.S. Application Data

(62) Division of application No. 10/948,792, filed on Sep. 24, 2004, now abandoned.

(30) Foreign Application Priority Data

Sep. 24, 2003    (DE) .................................. 103 44 229

(51) Int. Cl.
*G01N 21/00* (2006.01)
(52) U.S. Cl. ........ 422/503; 422/413; 422/500; 422/501; 422/502; 222/80; 436/180
(58) Field of Classification Search ............ 422/99–101, 422/413, 500–503; 222/80; 436/180
See application file for complete search history.

(56) References Cited

U.S. PATENT DOCUMENTS

| | | | | |
|---|---|---|---|---|
| 2,251,501 A | * | 8/1941 | Smith | 206/221 |
| 2,591,706 A | * | 4/1952 | Lockhart | 604/90 |
| 2,773,591 A | | 12/1956 | Jensen | 206/220 |
| 3,220,588 A | * | 11/1965 | Lipari | 206/222 |
| 3,704,206 A | | 11/1972 | Freake et al. | |
| 3,825,410 A | | 7/1974 | Bagshawe | |
| 3,888,629 A | | 6/1975 | Bagshawe | |
| 4,324,758 A | | 4/1982 | Eisentraut et al. | |
| 4,526,690 A | | 7/1985 | Kiovsky et al. | |
| 5,147,780 A | | 9/1992 | Pouletty et al. | |
| 5,362,654 A | | 11/1994 | Pouletty | |
| 5,364,591 A | | 11/1994 | Green et al. | |
| 5,710,041 A | | 1/1998 | Moorman et al. | |
| 5,863,502 A | | 1/1999 | Southgate et al. | |
| 6,495,373 B1 | * | 12/2002 | Mauchan | 436/165 |
| 2002/0137199 A1 | | 9/2002 | Muir et al. | |

FOREIGN PATENT DOCUMENTS

| | | |
|---|---|---|
| DE | 43 41 862 A1 | 6/1994 |
| DE | 195 45 130 A1 | 6/1997 |
| DE | 101 37 565 A1 | 3/2003 |
| EP | 0 279 574 A | 8/1988 |
| EP | 0279574 * | 8/1988 |
| EP | 0 329 120 A2 | 8/1989 |

(Continued)

*Primary Examiner* — Jyoti Nagpaul
(74) *Attorney, Agent, or Firm* — Welsh Flaxman & Gitler

(57) ABSTRACT

Microstructured device for removable storage of small amounts of liquid with the following features: the device has a carrier; the device has a first cavity with at least one first section for storage of a small amount of liquid; the first section of the first cavity is molded into the carrier; the first section is closed with a cover element and a blocking element; the device has a means for transmission of a force from the cover element to the blocking element which destroys the connection between the blocking element and the carrier or destroys the blocking element itself so that the amount of liquid can be removed from the first section of the cavity.

12 Claims, 7 Drawing Sheets

FOREIGN PATENT DOCUMENTS

| | | |
|---|---|---|
| EP | 0 583833 A2 | 2/1994 |
| WO | WO 86/06 488 A1 | 11/1986 |
| WO | WO 99/01221 | 1/1999 |
| WO | WO 03/049869 | 6/2003 |

* cited by examiner

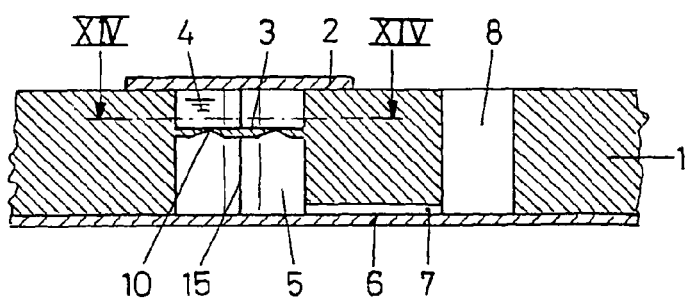
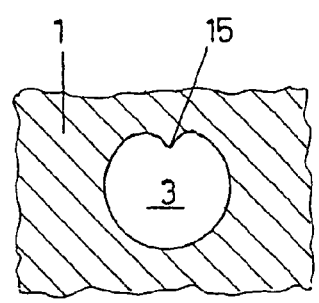
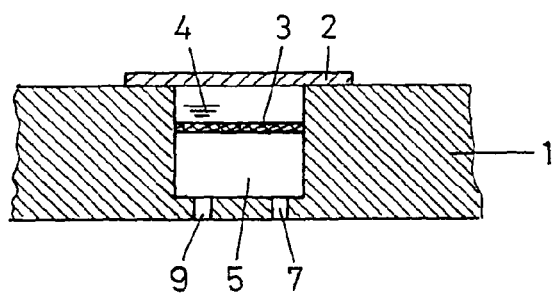
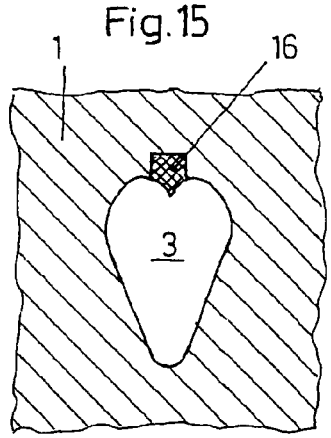
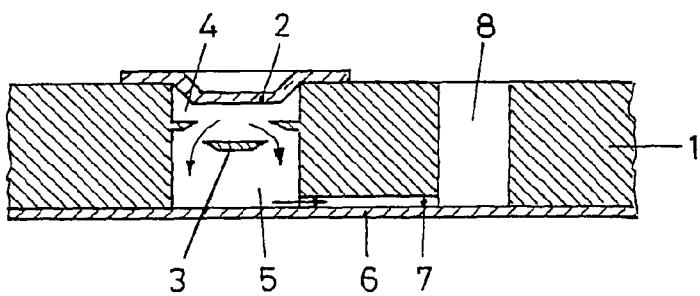

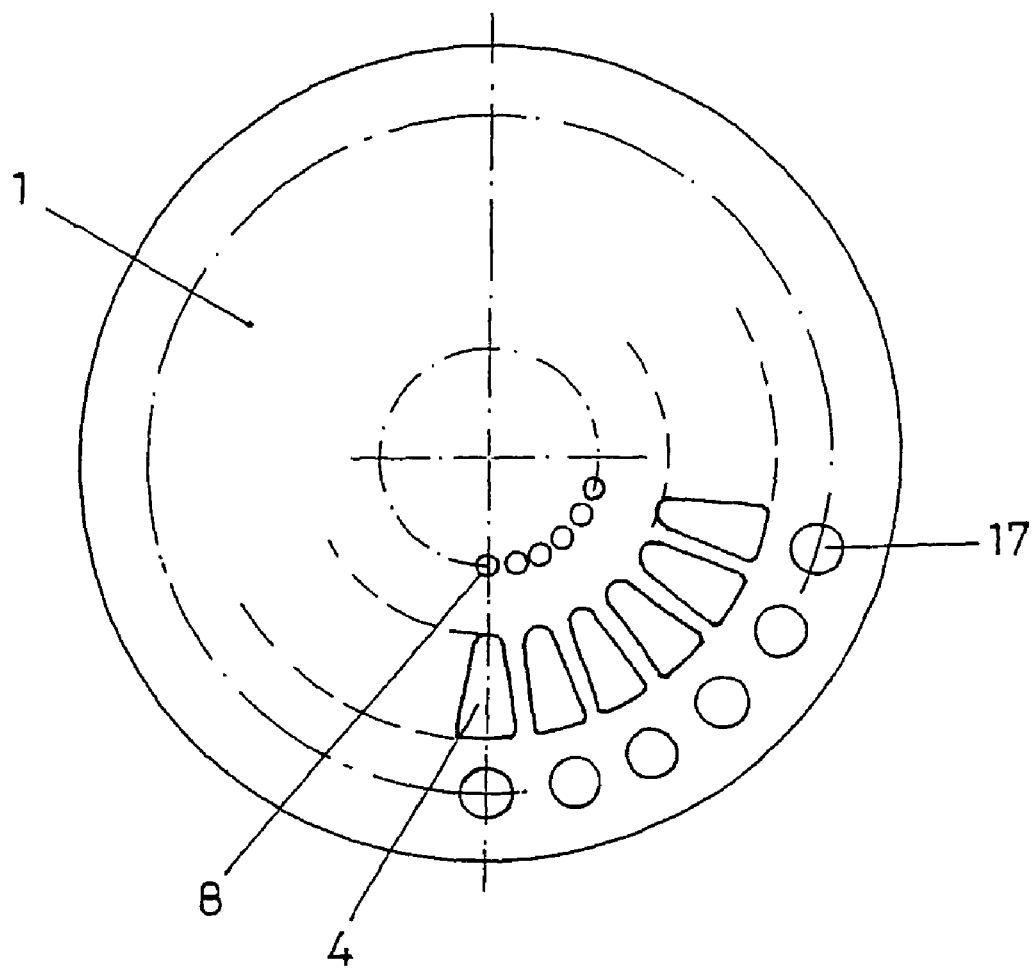

MICROSTRUCTURED DEVICE FOR REMOVABLE STORAGE OF SMALL AMOUNTS OF LIQUID AND A PROCESS FOR REMOVAL OF LIQUID STORED IN THIS DEVICE

CROSS REFERENCES TO RELATED APPLICATIONS

This application is a divisional of U.S. patent application Ser. No. 10/948,792, filed Sep. 24, 2004 now abandoned.

BACKGROUND OF THE INVENTION

This invention relates to a microstructured device for removable storage of small amounts of liquid and a process for removal of the liquid, which is stored in this device.

The prior art discloses microstructured devices, which have a plate-shaped carrier in which recesses on one side are formed. These recesses are connected, via channels, to removal chambers, via which a liquid can be removed from the device. The recess is connected via a feed channel to an inlet chamber via which a sample or a flushing liquid can be delivered to the device. The sample is then transported as a result of transport forces, for example as a result of capillary forces, or pressure forces, to the recess and travels from there via the removal channel to the removal opening. So-called containers are inserted into the initially open recess. The containers are plastic vessels in which liquid reagents are placed. By means of a pointed article, the container is opened such that the liquid located in the vessel can emerge from the container in order to mix with the liquid which has been supplied to the recess, via the feed channel. The containers known from the art are standardized and they can be inserted into various carriers of microstructured devices. The carriers generally have several recesses into which different containers with often different liquid reagents can be inserted.

The disadvantage in the use of containers for microstructured devices for removable storage of liquid is that the shape of the container largely dictates the design of the device. The containers make it necessary for there to be recesses, which are matched to the container in the carrier. The recesses, therefore, cannot be made individually for each carrier; this could lead, for example, to higher packing density of the liquids which are to be stored. Another disadvantage is that a relatively great effort is expended to move the liquids into the containers in order to then insert the containers as such into the carrier. This could be simplified by storing the liquids directly in the carrier.

Therefore is an object of the invention to provide a microstructured device for removable storage of small amounts of liquids in which an arrangement and configuration of the recesses as free as possible are possible and which enable direct storage of amounts of liquid in the carrier or the device without the need to use a special container.

SUMMARY OF THE INVENTION

A microstructured device for removable storage of small amounts of liquid includes a carrier. In the carrier there is a cavity with at least one first section for storage of a small amount of liquid. The first section of the cavity is molded into the carrier as a recess. This first section is closed with a cover element and a blocking element and is advantageously bordered by sidewalls, which are formed by the carrier. The device has a means for transmission of force from the cover element to the blocking element. By means of this force, a material connection between the blocking element and the carrier can be destroyed, or the blocking element itself can be destroyed, so that the amount of liquid can be removed from the first section of the cavity.

The amount of liquid in a device is thus not stored in a special container as in the existing art. Rather, the amount of liquid is stored directly in the device, in a cavity that is bordered on the one hand by the cover element and the blocking element as well as sidewalls, which are formed by the carrier. By destroying the blocking element, or the connection between the blocking element and the carrier, or the displacement of the blocking element, an opening can be cleared via which the liquid that is stored in the cavity can be removed from the cavity.

In one advantageously configured microstructured device, the carrier is in one piece. The first cavity is molded in a carrier that consists of one piece. In contrast to a carrier that is made of several parts, or to a microstructured device, in which the first cavity is not part of the carrier, or is not molded into the carrier, because the carrier is made in one piece, a compact and simple construction is achieved. This construction has advantages especially in the production of the microstructured device.

The blocking element and the carrier are connected to one another in one piece. It is possible for the blocking element and the carrier to be cemented to one another, or for the blocking element to be clamped in the carrier.

The connection between the carrier and the blocking element, or the blocking element itself, can have a scored site at which destruction of the blocking element, or of the bond between the blocking element and carrier, is easily possible.

The blocking element and the carrier can be positively connected to one another. In particular, it is possible, by means of the force that is applied to the cover element, for the blocking element to be able to move relative to the carrier into a release position in which the liquid can be removed from the first cavity.

The cover element can be a membrane, a film, or a microstructured plate.

The cover element can be connected to the carrier by lamination, sealing or cementing. It is possible for the cover element to be metal-coated.

The cover element of a device can be made such that when a minimum force is applied to destroy the connection between the blocking element and the carrier, or to destroy the blocking element, the cover element itself cannot be destroyed. To facilitate the emergence of liquid from the first section of the cavity, especially in cases in which the cover element cannot be destroyed, the device can be arranged such that it has elements for securing the cover element, with which the cover element can be kept in a deflected position when minimum force is applied. In this way it is possible, even after cessation of the minimum external force, to keep the cover element in the deflected position and thus also to maintain the pressure within the first section of the cavity.

It is possible for the cover element of a device to be made such that when a minimum force is applied to destroy the connection, between the blocking element and the carrier, or to destroy the blocking element, the cover element can be destroyed at least at one scored site. The scored site in the cover element can border in an area of the cover element that is smaller than the area bordered by the scored site between the carrier and the blocking element. In this way, it is possible for the cover element, or the area of the cover element bordered by the scored site from the cover element, to be pressed through the opening that has been cleared by the blocking element.

The device can include a means for destroying the cover element with which the cover element can be destroyed when a minimum force is applied. When the cover element is destroyed, the first section of the cavity can be ventilated, by which the emergence of the liquid from the first section of the cavity is facilitated.

A device can include elements for securing the blocking element with which after application of a minimum force the blocking element can be kept in a deflected position in order to prevent the opening, which has been cleared by the blocking element, from being closed again by the blocking element. If the opening cleared by the blocking element is permanently opened, the liquid, which has been stored in the first section of the cavity, can emerge from the first section in a facilitated manner even after cessation of the minimum force. As the element for securing the blocking element, the blocking element can have a catch projection that locks on a projection, or the like, of the carrier in the deflected position of the blocking element. As the element for securing the blocking element there could likewise be a conical recess into which the blocking element is pressed and is kept clamped when force is applied to the cover element.

The means for force transmission of the device can include the liquid that has been stored in the first section of the cavity. The means for force transmission can include a plunger which is attached to the cover element or the blocking element. Such a plunger can be mounted on the cover element.

The plunger that can be provided as a force transmission means on a device can be mounted in the middle of the cavity between the cover element and the blocking element. Alternatively, it is possible for the plunger to be located, not in the middle of the cavity between the cover element and the blocking element, but nearer one of the walls of the first section of the cavity. The force that is applied via the plunger thus does not act in the center of the blocking element. This leads to the fact that the blocking element is preferably destroyed in the area or the connection between the blocking element and the carrier is destroyed in the area in which the plunger is located.

The scored site between the blocking element and the carrier can surround the mounting area of the plunger on the blocking element with the exception of a so-called hinge area. In this way, it is possible for the blocking element not to be completely released from the connection to the carrier by the minimum force, but to remain securely connected via the hinge area to the carrier. The blocking element is thus, to a certain extent, hinged on the carrier. In combination with an element for securing the blocking element, the blocking element that is hinged on the carrier can be fixed in the opened position to the carrier. The hinge area is advantageously the area in which the plunger has the greatest possible distance to one wall of the first section of the cavity of the carrier. Opposite this hinge area then there can be the catch projection on the blocking element as the element for securing the blocking element.

The plunger of a device can have a spike on the end facing the blocking element.

A device can have a spike that is pointed at the blocking element on the side of the blocking element facing away from the first section of the cavity.

By moving the blocking element, as a result of the action of a force in the direction of the tip of this spike, the blocking element can be destroyed so that the liquid can be removed from the first cavity, or the first section of the cavity.

The first section of the cavity can be made cylindrical. Likewise, it is possible for the first section to be made in the shape of a truncated cone in order to facilitate removal from a mold.

The first section of the cavity can be joined to a second section, or a second cavity, which is separated from the first section by the blocking element. At least the second sections of the cavity or the second cavity, but advantageously also the cavity, and the first section of the cavity, have walls that can be wetted by the liquid.

The second section of the cavity or the second cavity can have a removal opening. The removal opening in the device can be provided in one wall of the second section of the cavity or one wall of the second cavity in the area which adjoins the scored site between the carrier and the blocking element as directly as possible. This should result in that the liquid, which is emerging from the first section of the cavity, can travel in a manner as simple as possible to the removal opening in the second section or in the second cavity.

A channel can be connected downstream of the removal opening.

In the second section of the cavity, or in the second cavity, and/or in the channel, which is downstream of the removal opening, there can be a means that enhances the capillary force. This means that enhances the capillary force is used to accelerate or enable the transport of liquid into the channel or through the removal opening. The means that enhances the capillary force can be microstructure elements, such as for example trenches, stelae, columns or the like, or a nonwoven fabric insert. It is possible for the microstructure elements combined with a nonwoven fabric insert to form the means that enhances the capillary force.

Furthermore, a feed channel can discharge into the second section of the cavity or into the second cavity.

In the device, at least one wall of the second section can be set back at least in sections relative to at least one bordering wall of the first section. This set-back section can be made in the manner of an annular groove.

The device can have a means for destroying the cover element.

BRIEF DESCRIPTION OF THE DRAWINGS

Embodiments of microstructured devices for removable storage of small amounts of liquid are detailed using the following drawings:

FIGS. 1 to 12a each show one embodiment for a microstructured device in a section;

FIG. 13 shows the device as shown in FIG. 1 after actuation;

FIG. 14 shows a section through the device along line XIV-XIV in FIG. 9;

FIG. 15 shows a corresponding section through the other embodiment;

FIG. 16 shows an overhead view of a device with several cavities for the accommodation of small amounts of liquid;

FIG. 17b shows the embodiment as shown in FIG. 17 and FIG. 17a in an overhead view.

DETAILED DESCRIPTION OF THE INVENTION

The embodiments shown in the FIGS. 1 to 16 for microstructured devices have great similarities, therefore the components that correspond to one another are provided with the same reference numbers.

Figure 1:
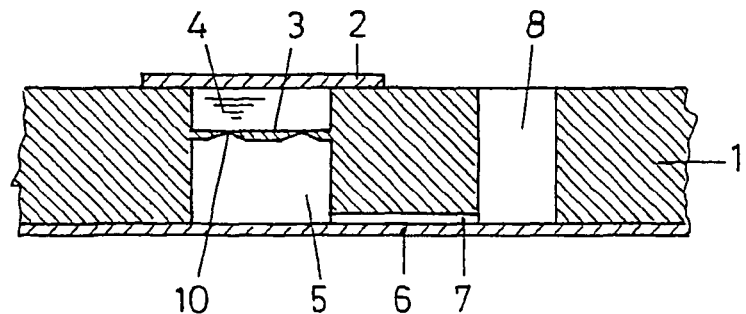

The embodiment shown in the FIG. 1, in a section, has an advantageously plate-shaped carrier 1 into which recesses are made which are opposite one another from two sides and which are separated from one another by a blocking element 3. The opening of a recess is closed by a cover element 2, by which a first cavity 4 is formed between the cover element 2, the blocking element 3 and the sidewalls of the recess. This first cavity 4 is completely filled with a small amount of liquid. Likewise it is possible for the first cavity 4 to be filled only partially with the amount of liquid and to contain a small gas bubble. The other recess is closed with a film 6 that is applied to the surface of the carrier 1, in which surface there is a recess. In this way a second cavity 5 is formed which is bordered by the blocking element 3, of the film 6, and by the sidewalls of the recesses.

The carrier 1 has a through hole 8 that is closed on one side by the film 6. This through hole forms a removal chamber that is connected via a removal channel 7 to the second cavity 5.

The blocking element 3 has a peripheral scored site 10 which is formed by the thinning of the material on the side facing the second cavity 5.

The small amount of liquid that is stored in the first cavity 4 can be removed as follows from the first cavity 4. By the action of a force on the cover element 2, the cover element is pressed in the direction of the amount of liquid. Since the amount of liquid is essentially incompressible, the force that is applied to the cover element 2 is transferred to the blocking element 3. This force results in that, as shown in FIG. 13, the middle part of the blocking element is broken out of the remaining blocking element 3 along the peripheral scored site 10 and thus a connection is formed between the first cavity 4 and the second cavity 5. As a result of the transport forces, here generally compressive forces, the action of gravity or capillary forces, the liquid is then transported out of the first cavity 4 into the second cavity 5, then into the channel 7, and finally into the removal chamber 8. Advantageously, a reagent in liquid or solid form or a sample with which the amount of liquid stored originally in the first cavity is reacted or mixed can be placed in the second cavity 5 or in the removal chamber 8.

Figure 2:
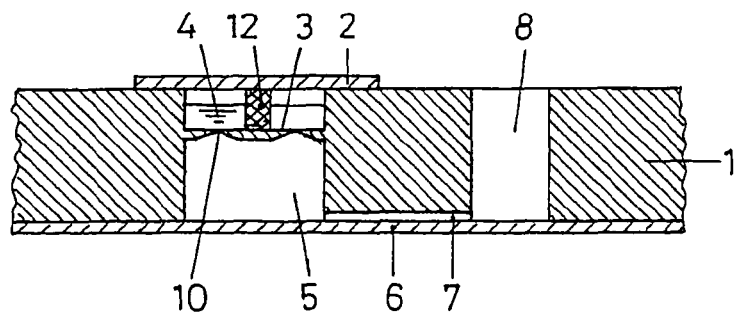

The embodiment shown in FIG. 2 differs from the embodiment shown in FIG. 1 in that the first cavity 4 is not completely filled with the amount of liquid. Rather, between the liquid level and the cover element 2 a gas-filled space is formed. So that the force which acts on the cover element 2 for releasing the amount of liquid can be transferred to the cover element 10, between the cover element 2 and the blocking element 3 there is a plunger which is connected in one piece to the middle part of the blocking element.

Figure 3:
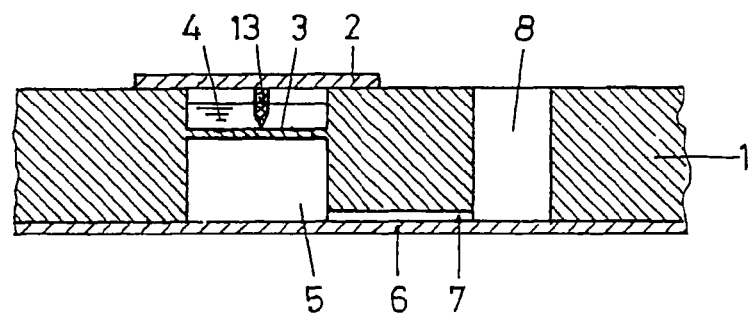

In contrast to the embodiment that is shown in FIG. 1, the embodiment shown in FIG. 3 has a blocking element that does not have a scored site 10. Instead, to destroy the blocking element 3, a spike 13 that is pointed with its tip at the blocking element 3 is attached to the bottom of the cover element. If at this point the action of a force presses the cover element 2 in the direction to the blocking element 3, the spike 13 with its tip pierces the blocking element 3 to neutralize the blocking action of the blocking element 3. The liquid that is stored in the first cavity 4 can then penetrate into the second cavity 5 through the opening that has been produced by means of the spike 13 in the blocking element.

Figure 4:
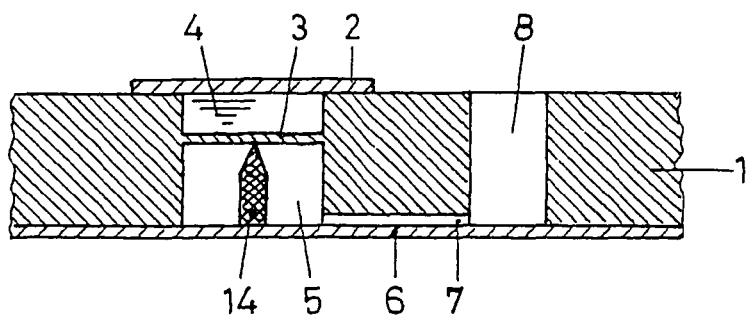

In FIG. 4, an embodiment similar to FIG. 3 is described in which the first cavity 4 is completely filled with an amount of liquid, while a pin 14 which projects in the direction to the blocking element 3, is attached to the film 6, and causes destruction of the blocking element 3 to release the amount of liquid. By the action of the force on the cover element 2, via the amount of liquid in the first cavity 4, the blocking element 3 is deflected in the direction to the spike 14 that with its tip pierces the blocking element in order to destroy it. Thus the amount of liquid can penetrate out of the first cavity 4 into the second cavity 5.

Figure 5:
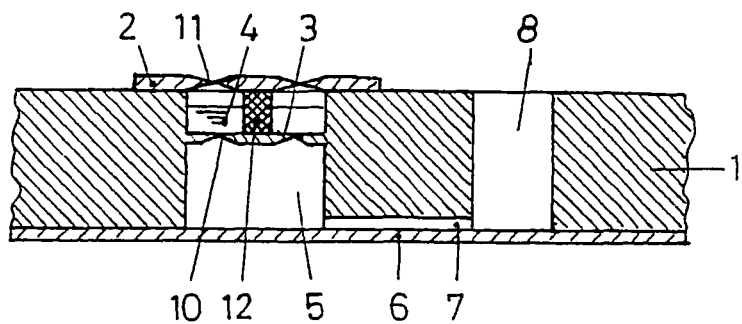

The embodiment of a microstructured device that is shown in FIG. 5 is made similarly to the device shown in FIG. 2. In contrast to the embodiment shown in FIG. 2, the embodiment in FIG. 5 in the cover element 2 has a peripheral scored site 11. As soon as the action of the force presses the middle area of the cover element down, the scored site 11 breaks and the plunger 12 presses on the middle part of the blocking element 3 which finally also breaks along the scored site 10. The liquid that is stored in the first cavity 4, can enter the second cavity 5, at the same time the first cavity 4 being vented via the opening in the cover element 2. The air that flows afterward facilitates outflow of the amount of liquid from the first cavity 4 into the second cavity 5.

Figure 5A:
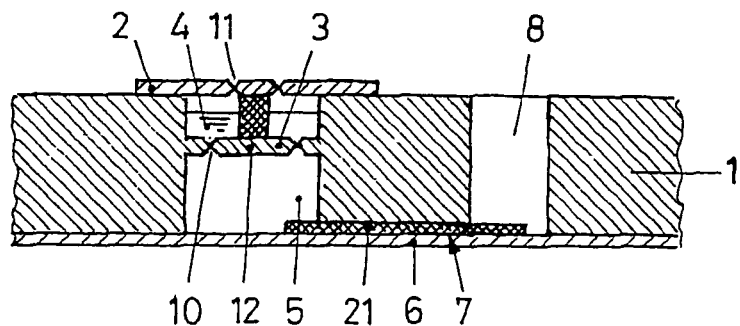

FIG. 5a shows one version of the embodiment shown in FIG. 5. In this version the scored site in the blocking element 10 borders a roughly circular area which completely surrounds the plunger 12. The scored site 11 in the cover element 2 also borders a circular area with a bottom that is adjoined by the plunger 12. The area which has is bordered by the scored site 11 in the cover element 2 thus has a much smaller diameter than the area of the blocking element bordered by the scored site 10. This results in that when a minimum force is applied, which in this case is enough to destroy the scored sites 10, 11, in the cover element 2 and in the blocking element 3 so that the broken-out areas can be pressed down with the plunger 12 into the second cavity 5. In this way, the opening that has been cleared by the blocking element 3 is prevented from closing again, so that the liquid from the cavity 4 can penetrate into the second cavity 5. Ventilation of the cavity 4 is enabled which enables facilitated penetration of liquid from the cavity 4 into the second cavity 5.

Furthermore, in the version of the device as shown in FIG. 5a, in the removal channel 7, and in the area of the second cavity 5 upstream of the removal channel, there is an insert 21 of nonwoven fabric. This nonwoven insert causes increased capillary force which enables accelerated transport of the liquid which has entered the second cavity 5 through the removal channel 8.

Figure 6:
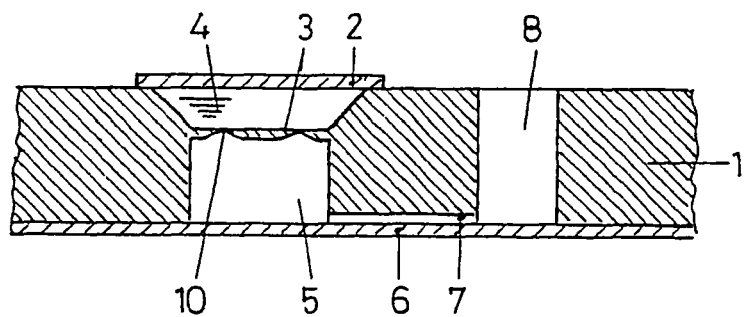

The embodiment of a microstructured device that is shown in FIG. 6 corresponds essentially to the one shown in FIG. 1, but different than the device shown in FIG. 1, the device shown in FIG. 6 does not have a cylindrically formed first cavity. The first cavity of the embodiment shown in FIG. 6 runs conically in the direction to the blocking element 3 and thus is made essentially in the shape of a truncated cone.

Figure 7:
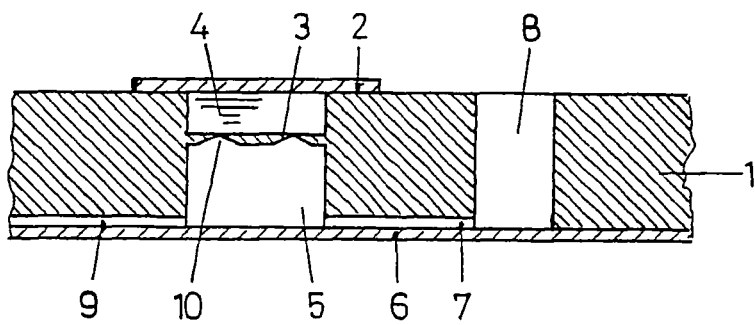

The embodiment shown in FIG. 7 corresponds essentially to the embodiment as shown in FIG. 1, but in addition, it has a feed channel 9 which discharges into the second cavity 5. Via this feed channel 9, a second liquid can be routed into the second cavity 5, which after destruction of the blocking element 3 is mixed with the amount of liquid from the first cavity 4. The supplied liquid, like the amount of liquid in the first cavity 4, can be a sample, a liquid reagent or a flushing liquid.

The embodiment shown in FIG. 8 has a first cavity 4 and a second cavity 5, the device that is shown in FIG. 8 is made slightly different from the ones shown in FIGS. 1 to 7. The carrier of the embodiment, as shown in FIG. 8, has a blind hole-like recess which is made on one side in the carrier and which is divided by a blocking element 3 that has been cemented between the sidewalls into a first cavity 4 and a second cavity 5. From the side of the carrier opposite the recess, channels 9, 7 are routed from the outside of the carrier as far as the second cavity 5 and discharge into the second cavity 5. One channel forms a feed channel 9, while the other channel forms a removal channel 7. The blocking element 3 that has been cemented, pressed or shrunk between the first cavity 4 and the second cavity 5 has a scored site 10 which is made in the conventional manner and on which the blocking element 3 can be destroyed. Otherwise the first cavity 4 is completely filled with the amount of liquid so that action of a force on the cover element 2 causes destruction of the blocking element 3, by which the amount of liquid in the first cavity 4 can enter the second cavity 5.

FIGS. 9 and 14 show one embodiment that is provided with special means for destroying the cover element 2. The means for destruction are formed by a projection 15 of the sidewall of the first cavity 4, which projection projects into the first cavity 4 in the shape of a wedge. This projection forms a tip that adjoins the cover element 2. If at this point the cover element 2 is pressed down by the action of a force, the tip of the projection 15 is pressed into the cover element 2 and destroys it. In this way, it becomes possible to vent the first cavity 4 when the liquid contained in the first cavity 4 is released by destroying the blocking element 3; this facilitates the emergence of liquid from the second cavity 5. As shown in FIG. 14, the first cavity has a cross section that is circular in cross section.

FIG. 15 conversely shows a cross section of a similar device that is sector-like. This has the advantage that in a device with several such first cavities, as it is shown for example in FIG. 16, there can be a plurality of first cavities arranged compactly inside one another. FIG. 15 shows another alternative means for destroying the cover element 2, which means is formed by a wedge 16 which is inserted in a recess of the side wall of the first chamber 4, but otherwise, similar to the projection 15 as shown in FIG. 14, results in destruction of the cover element 2 when a force acts.

The overhead view of the device that is shown in FIG. 16 shows that a device advantageously has several first cavities 4 and the associated blocking element 3. The second cavity (not shown) that is located under the first cavity 4 is connected via a feed channel that is not shown to an inlet chamber 17 and via a removal channel to a removal chamber 8. The inlet chambers 17 can also be connected to one another.

Figure 10:
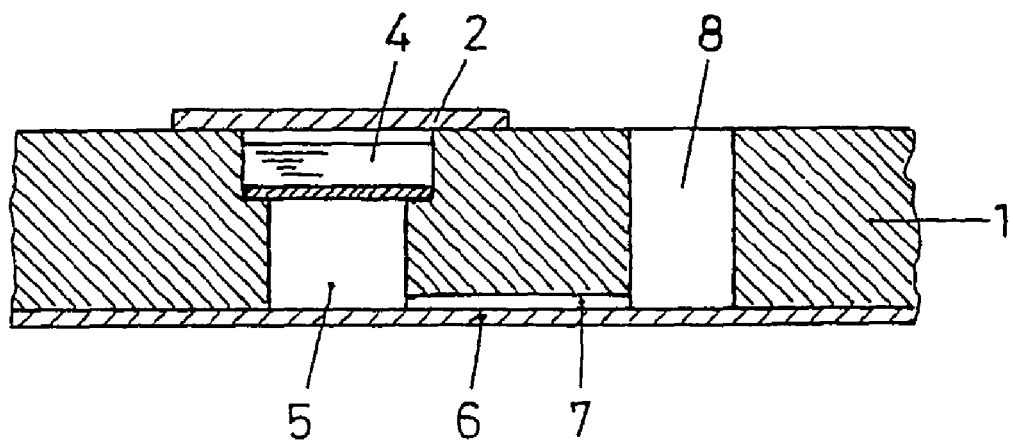

FIG. 10 shows one embodiment for a microstructured device that has a through hole with a shoulder in the carrier 1. In this way, the through hole above the shoulder has a diameter which is larger than underneath the shoulder. A membrane which forms the blocking element 3 and which has an outside diameter which corresponds to the inside diameter of the through hole is placed on the shoulder. The blocking element 3 divides the through hole into two parts which are separated from one another; specifically a first cavity and a second cavity 5, the first cavity 4 being closed with the cover element 2 and the second cavity 5 being closed with the film 6. Otherwise the device has a channel 7 that is made in the conventional manner and a removal chamber 8 which is made in the conventional manner.

Figure 17:
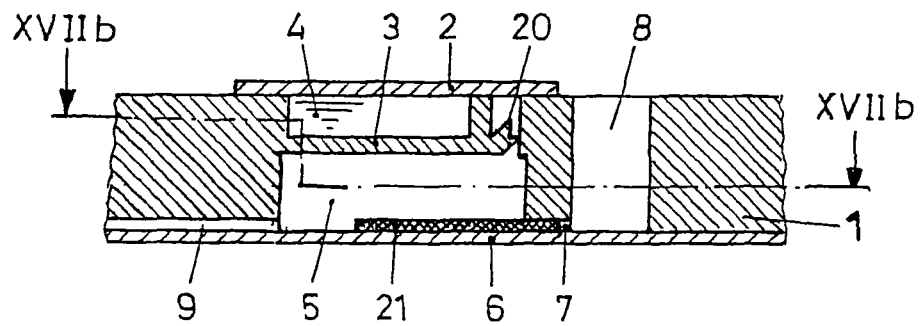
FIG. 17 shows one embodiment for a device before a minimum force is applied.
Figure 17A:
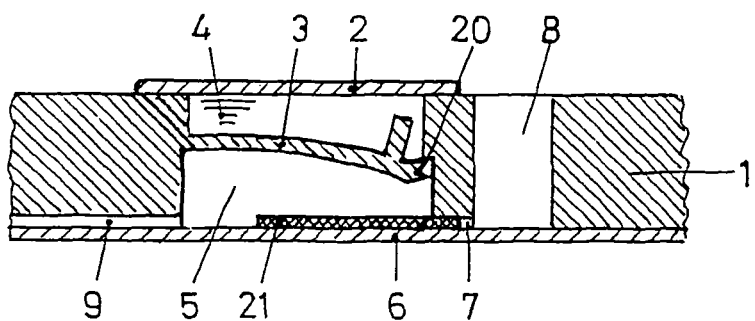
FIG. 17a shows the embodiment as shown in FIG. 17 after application of the minimum force.

The embodiment shown in FIGS. 17 to 17b has a cavity 4 and a second cavity 5 which are essentially oval in cross section. Between the two cavities 4, 5 is the blocking element 3. This blocking element 3 is connected in one piece to the carrier 1. Furthermore, the blocking element 3 is connected in one piece to the plunger 12 that in the first end area of the blocking element 3 is inserted between a cover element 2 with which the cavity 4 is closed to the top, and the blocking element 3. In this first end area of the blocking element, there is scored site 10 between the blocking element 3 and the carrier 1 which extends proceeding from this end area along the side wall of the cavities 4, 5 to the opposite end area, the opposite second end area not being provided with a scored site. If the minimum force necessary to destroy the blocking element is applied to the cover element 2, the blocking element tears away from the carrier 1 along the scored site. The blocking element 3 then only continues to be connected to the carrier 1 via the second end area. This second end area thus forms a hinge area on which the blocking element is pivotally supported.

A shoulder is molded into the second cavity 5 in the first end area of the blocking element 3. This shoulder interacts with the catch projection 20 on the first end area of the blocking element 3 as an element for securing the blocking element in the deflected position after the minimum force has acted on the cover element 2. By breaking out and deflecting the blocking element 3 down, the catch projection 20 catches behind the shoulder in the wall of the second cavity 5. In this deflected position then the liquid can flow out of the cavity 4 into the second cavity 5, even after the minimum force is no longer acting on the cover element 2.

On the bottom of the second cavity 5, in the middle area and the end area there is a nonwoven fabric insert 21. This nonwoven insert causes increased capillary force in order to transport the liquid that has entered the second cavity 5 through the removal channel 7 to the removal chamber 8.

Figure 11:
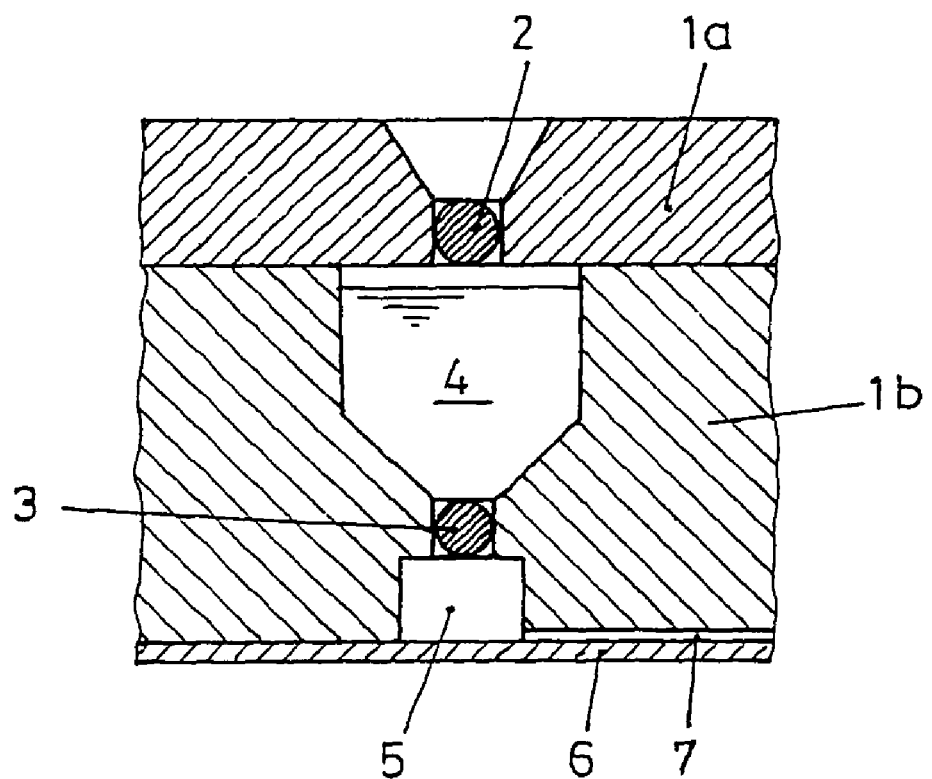
Figure 17:
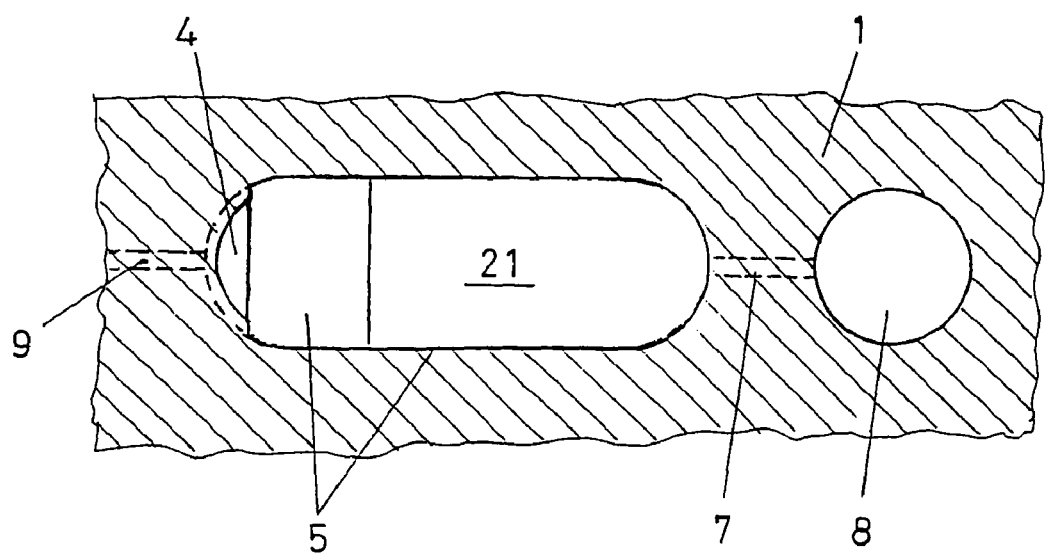

The embodiment shown in FIG. 11 differs from the devices described so far by a host of features; the same features being provided with the same reference number. The carrier 1a, 1b of the device, as shown in FIG. 11, is made in two parts and has a plate-shaped top part 1a and a plate-shaped bottom part 1b. The top part has a conical recess that is adjoined by a cylindrical hole. A preferably slightly elastic ball is inserted to form a seal into the cylindrical hole and forms the cover element 2 of the device. The bottom part 1b of the carrier which is attached on the bottom of the top part 1a, flush with the recesses of the top part 1a and with the cover element 2, has a first cylindrical section, a conical section and a second cylindrical section which is adjoined by a cylindrical recess which is preferably made from the bottom. In the second cylindrical section of the first recess, a ball is inserted to form a seal as the blocking element 3 and separates the first cylindrical section and the conical section from the recess that has been made from the bottom of the bottom part 1b. The first cylindrical section and the conical section thus form the first cavity 4 that is almost completely filled with a liquid. A film 6 is applied to the bottom of the bottom part 1b, by which the second cavity is formed from the cylindrical recess that has been made from the bottom. By the action of a force on the cover element 2, via the liquid in the first cavity 4 the blocking element 3 is pressed into the second cavity 5, by which the liquid can flow into the second cavity and can be removed from it via the channel 7.

The diameter of the first cavity can be, for example, 1 to 3 mm, preferably 1.5 mm. The same applies to the second cavity. The blocking element 3 and the cover element 2 can have a diameter from 0.5 to 0.7 mm.

The diameter of the first cavity of one of the embodiments as shown in FIGS. 1 to 10 can be 2 to 8 mm, but preferably 2 to 5 mm. The height can be 1 to 7 mm and the volume can be between 10 to 100 mm$^3$. The carrier 1 and the blocking element 3 can be produced from polystyrene or polycarbonate.

Figure 12:
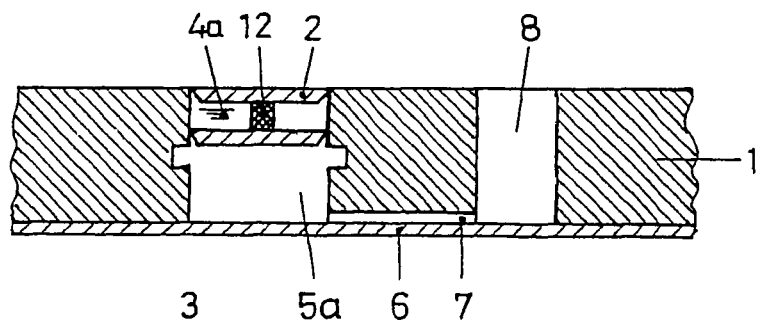

The embodiment shown in FIG. 12, in contrast to the other embodiments, has only one cavity, which has a first section 4a, a second section 5a. The cavity can be divided in a variable manner, into a first section 4a and a second section 5a. Separation takes place via a blocking element that is movably supported between the side walls of the first section. This blocking element is connected, via a plunger 12, to a cover element 2 that is likewise movably supported in the first section 4a. In the upper area of the second section 5a of the cavity, which area faces the first section 4a, the sidewall of the cavity is set back in the manner of an annular groove.

The device shown in FIG. 12 can be operated as follows. First of all, the component which is formed from the blocking element 3, the plunger 12 and the cover element 2 is pulled out of the first section 4a to such an extent that the cover element 2 projects out of the first section 4a. The cavity 4a can then be filled with liquid through a gap that forms between the cover element 2 and the top end of the first section 4a of the cavity. In order to store the liquid in the first section 4a of the cavity, the component consisting of the blocking element 3, the plunger 12 and the cover element 2 is pushed down until the cover element 2 adjoins the side walls of the first section 4a of the cavity, forming a seal. If at this point the amount of liquid stored in the first section 4a of the cavity is to be released, the cover element 2 is moved down by the action of a force. Then the blocking element 3 projects into the annular groove-like section on the top end of the second section 5a of the cavity. The annular groove then produces a fluidic connection between the first section 4a and the second section 5a of the cavity so that the liquid from the first section 4a can enter the second section 5a.

Figure 12A:
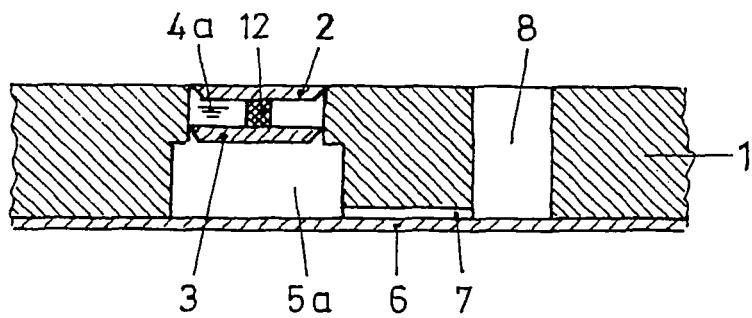

FIG. 12a shows one version of the embodiment as shown in FIG. 12. This version differs in that the second section 5a of the cavity has a larger diameter than the first section 4a. This shoulder makes it possible to move the cover element, the plunger 12 and the blocking element 11 completely down by application of an external force so that the cover element 2, the blocking element 3 and the plunger 12 are pushed completely into the second section 5a of the cavity and can drop into the latter. If the element consisting of the cover element 2, the blocking element 3 and the plunger 12 is in the second section 5a of the cavity, it is ensured that the liquid has traveled into the second section 5a, or can travel via the second section 5a of the cavity into the removal channel 7.

A device enables amounts of liquid to be stored for a longer time in a cavity before they are then released to carry out reactions or other chemical processes. The conventionally small vessels, or containers, which were inserted into the carrier in the past and which are filled beforehand with liquid and then must be pierced by means of tools are no longer necessary. The liquid is rather stored directly in the carrier; this has the advantage that a more compact arrangement of the amounts of liquid on a carrier is possible and also the geometry of the cavities that store the liquid can be freely chosen, as required by the dictates of practice.

What is claimed is:

1. A device for removable storage of small amounts of liquid, comprising:
    a microstructured carrier;
    a first cavity provided in said microstructured carrier for the storage of a small amount of liquid;
    a cover element provided on one side of said first cavity;
    a blocking element provided on a second side of said first cavity;
    wherein said first cavity is enclosed by said cover element, said blocking element and first and second sides formed by said microstructured carrier, wherein said first side of said microstructured carrier is integral with said blocking element and said second side comprises a projection for securing said blocking element;
    wherein sufficient force is applied directly by said cover element and then transferred to said blocking element, destroying the connection between said blocking element and said microstructured carrier or, said blocking element itself is destroyed so that the small amounts of liquid can be removed from said first cavity, said cover element constructed from a material to remain unpunctured when said sufficient force is applied directly to said cover element to destroy the connection between said blocking element and said microstructured carrier, or said blocking element itself is destroyed, wherein said projection secures said blocking element in a deflected position when said sufficient force is applied to said cover element.

2. The device as claimed in claim 1, wherein said microstructured carrier is plate shaped, said first cavity is molded as a recess into said microstructured carrier, said blocking element and said plate shaped microstructured carrier are molded into one piece and said cover element is a membrane, film or microstructured plate sealed to said plate shaped microstructured carrier.

3. A device for removable storage of small amounts of liquid, comprising:
    a microstructured carrier;
    a first cavity provided in said microstructured carrier for the storage of a small amount of liquid;
    a cover element provided on one side of said first cavity;
    a blocking element provided on a second side of said first cavity;
    wherein said first cavity is enclosed by said cover element, said blocking element and first and second sides formed by said microstructured carrier, wherein said first side of said microstructured carrier is integral with said blocking element and said second side comprises a projection for securing said blocking element;
    wherein a minimum force is applied directly by said cover element and then transferred to said blocking element, destroying the connection between said blocking element and said microstructured carrier or, said blocking element itself is destroyed so that the small amounts of liquid can be removed from said first cavity, said cover element constructed from a material to remain unpunctured when said minimum force is applied directly to said cover element to destroy the connection between said blocking element and said microstructured carrier, or said blocking element itself is destroyed, wherein said projection secures said blocking element in a deflected position when said minimum force is applied.

4. The device as claimed in claim 3, further including a second cavity separated from said first cavity by said blocking element.

5. The device as claimed in claim 4, wherein said second cavity has a removal opening.

6. The device as claimed in claim 5, wherein a channel is connected downstream of said removal opening.

7. The device as claimed in claim 4, wherein said removal opening is provided in a wall of said second cavity which directly adjoins a scored site between said microstructured carrier and said blocking element.

8. The device as claimed in claim 4, further including a capillary force-enhancing means in said second cavity and/or said channel.

9. The device as claimed in claim 8, wherein the capillary force-enhancing means is formed by microstructure elements such as trenches, stelae, columns, or a nonwoven fabric insert.

10. The device as claimed in claim 4, further including a feed channel discharging into said second cavity.

11. The device as claimed in claim 4, wherein at least one wall of said second cavity is set back at least in sections relative to at least one bordering wall of said first cavity.

12. A device for removable storage of small amounts of liquid, comprising:

a microstructured carrier;

a first cavity provided in said microstructured carrier for the storage of a small amount of liquid;

a cover element provided on one side of said first cavity;

a blocking element provided on a second side of said first cavity;

wherein said first cavity is enclosed by said cover element, said blocking element and first and second sides formed by said microstructured carrier, wherein said first side of said microstructured carrier is integral with said blocking element and said second side comprises a conical recess for securing said blocking element;

wherein a minimum force is applied directly by said cover element and then transferred to said blocking element, destroying the connection between said blocking element and said microstructured carrier or, said blocking element itself is destroyed so that the small amounts of liquid can be removed from said first cavity, said cover element constructed from a material to remain unpunctured when said minimum force is applied directly to said cover element to destroy the connection between said blocking element and said microstructured carrier, or said blocking element itself is destroyed, wherein said conical recess secures said blocking element in a deflected position when said minimum force is applied.

* * * * *